US012354530B2

(12) United States Patent
Kim et al.

(10) Patent No.: US 12,354,530 B2
(45) **Date of Patent: *Jul. 8, 2025**

(54) DISPLAY DEVICE INCLUDING LIGHT-EMITTING DIODE BACKLIGHT UNIT

(71) Applicant: Samsung Electronics Co., Ltd., Suwon-si (KR)

(72) Inventors: Byungil Kim, Hwaseong-si (KR); Yangwook Kim, Seoul (KR); Pansoo Kim, Yongin-si (KR); Hyeongtae Kim, Seoul (KR); Sukyun Woo, Hwaseong-si (KR); Jisu Yoon, Hwaseong-si (KR); Hyunji Yoon, Daegu (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/463,914

(22) Filed: Sep. 8, 2023

(65) Prior Publication Data

US 2023/0419887 A1 Dec. 28, 2023

Related U.S. Application Data

(63) Continuation of application No. 17/537,950, filed on Nov. 30, 2021, now Pat. No. 11,790,834.

(30) Foreign Application Priority Data

Dec. 8, 2020 (KR) ........................ 10-2020-0170756
Apr. 28, 2021 (KR) ........................ 10-2021-0055034

(51) Int. Cl.
*G09G 3/32* (2016.01)
*G09G 3/34* (2006.01)

(52) U.S. Cl.
CPC ............. *G09G 3/32* (2013.01); *G09G 3/3426* (2013.01); *G09G 2300/0814* (2013.01); *G09G 2300/0842* (2013.01); *G09G 2310/08* (2013.01); *G09G 2320/0233* (2013.01); *G09G 2320/0257* (2013.01); *G09G 2320/0633* (2013.01); *G09G 2320/064* (2013.01); *G09G 2320/066* (2013.01)

(58) Field of Classification Search
CPC ... G09G 3/32–3291; G09G 3/34–3426; G09G 2300/0804–0819;
(Continued)

(56) References Cited

U.S. PATENT DOCUMENTS 6,980,181 B2 12/2005 Sudo
6,982,527 B2 1/2006 Lee et al.
(Continued)

FOREIGN PATENT DOCUMENTS

KR 10-2006-0129094 A 12/2006
KR 10-2012-0008185 A 1/2012
(Continued)

OTHER PUBLICATIONS

KR Office Action for correspodning Korean Patent Application No. 10-2021-0055034 issued on Oct. 18, 2024.

*Primary Examiner* — Nathan Danielsen
(74) *Attorney, Agent, or Firm* — Harness, Dickey & Pierce, P.L.C.

(57) ABSTRACT

A display device may include: a light-emitting diode (LED) backlight unit (BLU), a pixel driving circuit configured to generate a scan signal and an image signal, a pixel circuit configured to generate an output current based on the scan signal and the image signal, and transmit the output current to the LED BLU, the pixel circuit including, a first transistor connected between an input pin and a node, the input pin
(Continued)

configured to receive the image signal, the first transistor including a gate terminal configured to receive the scan signal, a second transistor connected between the node and a ground terminal, the second transistor including a gate terminal connected to the node, a third transistor connected between the node and a gate node, a fourth transistor configured to generate the output current according to a voltage of the gate node, and a capacitor connected to the gate node.

19 Claims, 16 Drawing Sheets

(58) Field of Classification Search
CPC ... G09G 2300/0842; G09G 2310/0243; G09G 2310/0289–0294; G09G 2310/06; G09G 2310/066; G09G 2310/08; G09G 2320/0233; G09G 2320/0242; G09G 2320/0257; G09G 2320/029; G09G 2320/0295; G09G 2320/04; G09G 2320/043–046; G09G 2320/0633; G09G 2320/064; G09G 2320/066; G09G 2320/0693
See application file for complete search history.

(56) References Cited

U.S. PATENT DOCUMENTS

| | | | |
|---|---|---|---|
| 7,511,694 B2 | 3/2009 | Kim et al. | |
| 7,742,019 B2 | 6/2010 | Takahara | |
| 7,852,308 B2 | 12/2010 | Kim | |
| 8,373,348 B2 | 2/2013 | Liu et al. | |
| 8,441,431 B2 | 5/2013 | Yang | |
| 8,552,660 B2 | 10/2013 | Liu et al. | |
| 10,713,996 B2 | 7/2020 | Kim et al. | |
| 10,762,836 B1 | 9/2020 | Bae et al. | |
| 10,847,077 B2 | 11/2020 | Sakariya et al. | |
| 2005/0168491 A1 | 8/2005 | Takahara et al. | |
| 2006/0202637 A1 | 9/2006 | Chiang et al. | |
| 2009/0289606 A1 | 11/2009 | Lauxtermann et al. | |
| 2011/0018914 A1* | 1/2011 | Ishikawa .............. | G09G 3/3426 345/691 |
| 2011/0075072 A1 | 3/2011 | Kim et al. | |
| 2011/0149187 A1 | 6/2011 | Yang | |
| 2014/0152642 A1 | 6/2014 | Kim et al. | |
| 2017/0150572 A1 | 5/2017 | Zhang | |
| 2018/0144691 A1 | 5/2018 | Choi et al. | |
| 2018/0287599 A1 | 10/2018 | Tomita et al. | |
| 2020/0090572 A1 | 3/2020 | Wu et al. | |
| 2020/0135092 A1 | 4/2020 | Ahmed | |
| 2020/0335033 A1 | 10/2020 | Kim et al. | |
| 2020/0335034 A1 | 10/2020 | Lee | |

FOREIGN PATENT DOCUMENTS

| | | |
|---|---|---|
| KR | 10-2014-0071097 A | 6/2014 |
| KR | 10-2018-0058245 A | 6/2018 |
| KR | 10-2020-0040482 A | 4/2020 |
| KR | 10-2020-0093940 A | 8/2020 |

* cited by examiner

DISPLAY DEVICE INCLUDING LIGHT-EMITTING DIODE BACKLIGHT UNIT

CROSS-REFERENCE TO RELATED APPLICATIONS

This U.S. non-provisional application is a continuation of U.S. application Ser. No. 17/537,950, filed on Nov. 30, 2021, which is based on and claims the benefit of priority under 35 U.S.C. § 119 to Korean Patent Application Nos. 10-2020-0170756, filed on Dec. 8, 2020, and 10-2021-0055034, filed on Apr. 28, 2021, both filed in the Korean Intellectual Property Office, the disclosures of each of which are incorporated by reference herein in their entireties.

BACKGROUND

Various example embodiments of the inventive concepts relate to semiconductor devices, systems including the semiconductor devices, and/or methods of operating the semiconductor devices, etc., and more particularly, to a display device including a light-emitting diode (LED) back light unit (BLU), a system including the LED BLU, and/or a method of operating the LED BLU, etc.

A display device includes a display panel for displaying an image and a display driving circuit for driving the display panel. Recently, the use of display panels having an organic light-emitting diode (OLED) has been increasing.

Recently, a local dimming technique of driving a plurality of LED elements for each area of a display panel has been widely applied to a backlight device. In particular, a full array local dimming (FALD) method of arranging LED elements in a two-dimensional (2D) array over the entire area of a display panel has been receiving great attention. Because the FALD method requires a large number of LED elements, a significant number of pixel circuits for driving the LED elements are also desired and/or required.

SUMMARY

Various example embodiments of the inventive concepts provide a display device including a light-emitting diode (LED) back light unit (BLU) in which the number of circuits for driving a display panel is reduced by separately arranging a pixel circuit and a pixel driving circuit.

According to an aspect of at least one example embodiment of the inventive concepts, there is provided a display device including a light-emitting diode (LED) backlight unit (BLU), a pixel driving circuit configured to generate a scan signal and an image signal, a pixel circuit configured to generate an output current based on the scan signal and the image signal, and transmit the output current to the LED BLU, the pixel circuit including, a first transistor connected between an input pin and a node, the input pin configured to receive the image signal, the first transistor including a gate terminal configured to receive the scan signal, a second transistor connected between the node and a ground terminal, the second transistor including a gate terminal connected to the node, a third transistor connected between the node and a gate node, a fourth transistor configured to generate the output current according to a voltage of the gate node, and a capacitor connected to the gate node.

According to another aspect of at least one example embodiment of the inventive concepts, there is provided a display device including a light-emitting diode (LED) backlight unit (BLU), a pixel driving circuit configured to generate a scan signal and an image signal, and a pixel circuit with a current mirror structure, the pixel circuit configured to, generate an output current based on the scan signal and the image signal, transmit the output current to the LED BLU, and discharge a gate node of the driver transistor in response to a de-ghost signal.

According to another aspect of at least one example embodiment of the inventive concepts, there is provided a display device including a light emitting diode (LED) back light unit (BLU), a pixel circuit configured to generate an output current based on a scan signal and an image signal, and transmit the output current to the LED BLU, the pixel circuit including a plurality of transistors connected in a current mirror form, and a pixel driving circuit configured to output the image signal through a data line, and output the image signal to the pixel circuit, and output the image signal through a data line, and output the image signal to the pixel circuit.

BRIEF DESCRIPTION OF THE DRAWINGS

Various example embodiments of the inventive concepts will be more clearly understood from the following detailed description taken in conjunction with the accompanying drawings in which.

DETAILED DESCRIPTION

Hereinafter, various example embodiments of the inventive concepts are described in connection with the accompanying drawings.

Figure 1:
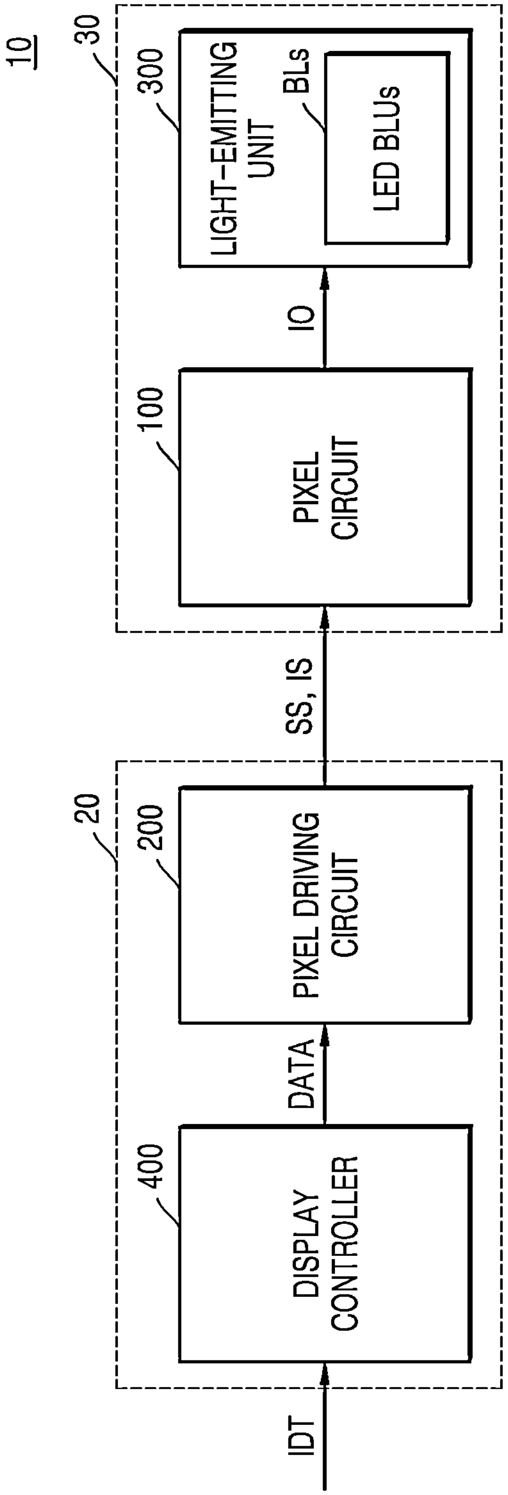
FIG. 1 is a block diagram of a display device according to at least one example embodiment of the inventive concepts.

FIG. 1 is a block diagram of a display device 10 according to at least one example embodiment of the inventive concepts.

Referring to FIG. 1, the display device 10 may include a display panel 30 and/or a display driving circuit 20 for driving the display panel 30, etc., but the example embodiments are not limited thereto and may include a greater or lesser number of constituent elements. The display driving circuit 20 may include a pixel driving circuit 200 for driving a pixel circuit 100, and/or a display controller 400 for controlling the pixel driving circuit 200, etc., and the display panel 30 may include a light-emitting unit 300, and/or the pixel circuit 100 that provides an output current IO to the light-emitting unit 300, etc., but the example embodiments are not limited thereto.

The display device 10 according to at least one example embodiment of the inventive concepts may be mounted on an electronic device having an image display function, but is not limited thereto. For example, the electronic device may include a smartphone, a personal computer (PC), a tablet, a portable multimedia player (PMP), a camera, a wearable device, a television, a digital video disk (DVD) or Blu-Ray player, a refrigerator, an air conditioner, an air purifier, a set-top box, a robot, a drone, a medical device, a navigation device, a global positioning system (GPS) receiver, a vehicle device, furniture, and/or a measuring device, a virtual reality and/or augmented reality device, an Internet of Things (IoT) device, other smart devices, etc., but is not limited thereto.

The light-emitting unit 300 of the display panel 30 may include light-emitting diode (LED) backlight units (BLUs) BLs arranged in, for example, a matrix form, and may display an image in units of frames, etc. LED BLU BL may constitute a unit in which brightness is controlled. For example, the LED may be an organic light-emitting diode (OLED), but is not limited thereto. In at least one example embodiment, the pixel driving circuit 200 may be implemented as a single chip, and the pixel circuit 100 may be implemented as a single chip, but the example embodiments are not limited thereto, and for example the pixel driving circuit 200 and/or the pixel circuit 100 may be implemented as a plurality of chips.

The LED BLU BL may be arranged on the rear side of the display panel 30 and may provide additional lighting to improve the contrast ratio of the display panel 30, but is not limited thereto. A plurality of LEDs in the LED BLU BL may be divided (and/or sub-divided) into a plurality of dimming groups corresponding to a plurality of regions of the display panel 30, and the number of LED elements in each dimming group may be the same or different between the plurality of dimming groups. In other words, the display panel 30 may be divided and/or sub-divided into a plurality of dimming group regions, and each dimming group region may include a plurality of LEDs, etc. Each of the plurality of LEDs may be implemented as a blue LED or a white LED, etc. However, the example embodiments of the inventive concepts are not limited thereto, and each of the plurality of LEDs may be implemented as one of various LEDs, such as a red LED and a green LED, etc.

The pixel circuit 100 may generate the output current IO according to a scan signal SS and/or an image signal IS provided from the pixel driving circuit 200, etc. In at least one example embodiment, one pixel circuit 100 may provide the output current IO to at least one LED BLU BL, but the example embodiments are not limited thereto.

The pixel driving circuit 200 may transmit the scan signal SS and/or the image signal IS to the pixel circuit 100 based on data DATA and/or control signals provided from the display controller 400, but is not limited thereto. The pixel driving circuit 200 may convert, in a digital-to-analog conversion manner, the data DATA (e.g., digital image data) received from the display controller 400 into the image signal IS (e.g., analog image signal) and output the image signal IS, and may convert, in a digital-to-analog conversion manner, a gate control signal (e.g., digital gate control signal) received from the display controller 400 to the scan signal SS (e.g., analog scan signal) and output the scan signal SS, but the example embodiments are not limited thereto.

The display controller 400 may control the overall operation of the display panel 30. The display controller 400 may be implemented with processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc.

The display controller 400 may receive data DATA, which is image data, and control signals from the outside (e.g., an external system board, etc.), and the control signals received by the display controller 400 may include a horizontal synchronization signal, a vertical synchronization signal, a main clock signal, and the like, but is not limited thereto. The display controller 400 may convert the data format of the data DATA to meet an interface specification with the pixel driving circuit 200, and the display controller 400 may provide the data DATA having a converted data format to the pixel driving circuit 200, etc. The display controller 400 may also provide control signals for controlling an operation timing of the pixel driving circuit 200 to the pixel driving circuit 200, but is not limited thereto. According to some example embodiments, the pixel driving circuit 200 and/or the display controller 400 may be combined into one or more circuits and/or may be collectively referred to as a display driving circuit and/or display driving circuitry, etc., but the example embodiments are not limited thereto.

Figure 2:
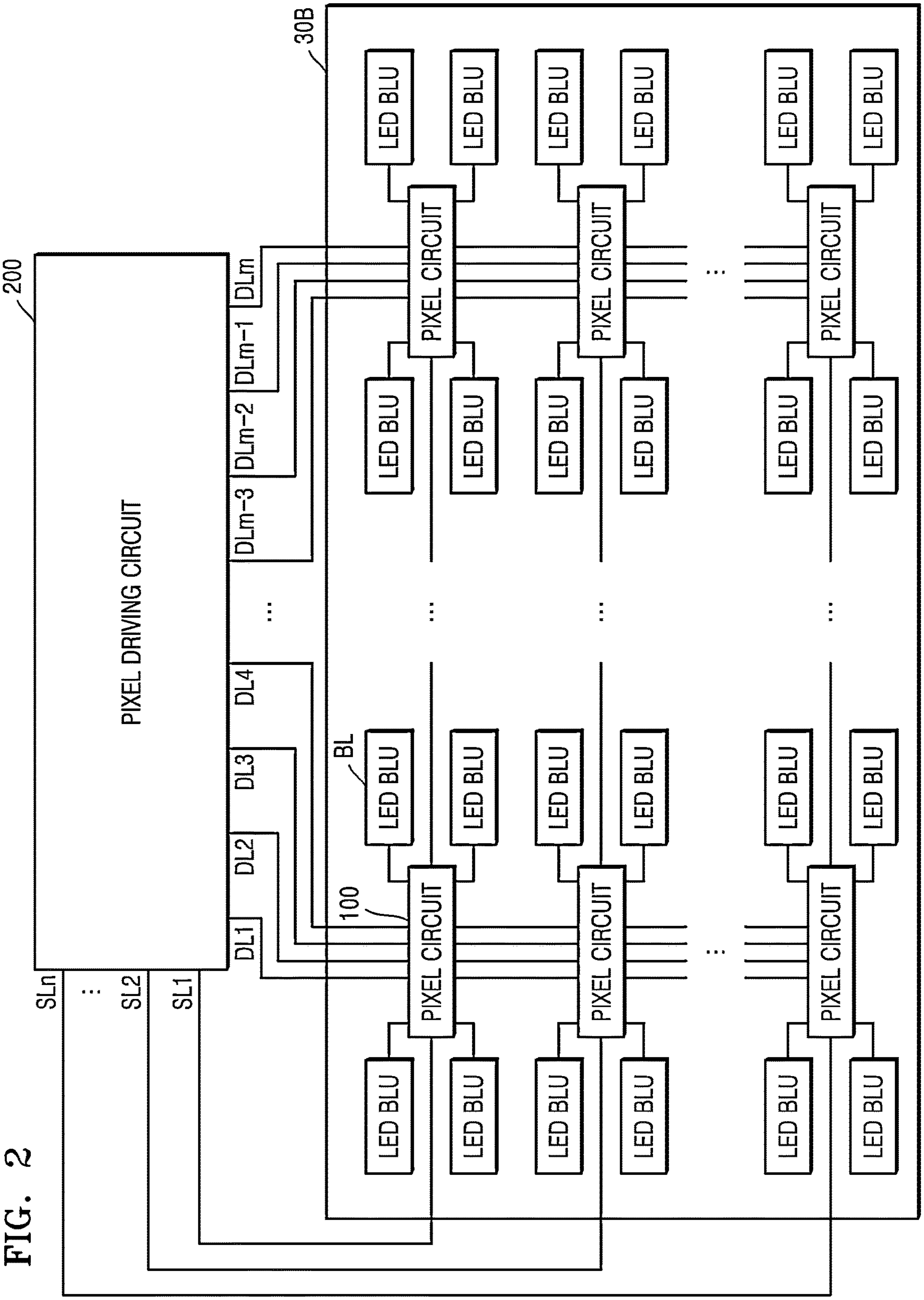
FIG. 2 is a diagram illustrating the arrangement of a display panel and a pixel driving circuit in a display device according to at least one example embodiment of the inventive concepts.
Figure 3:
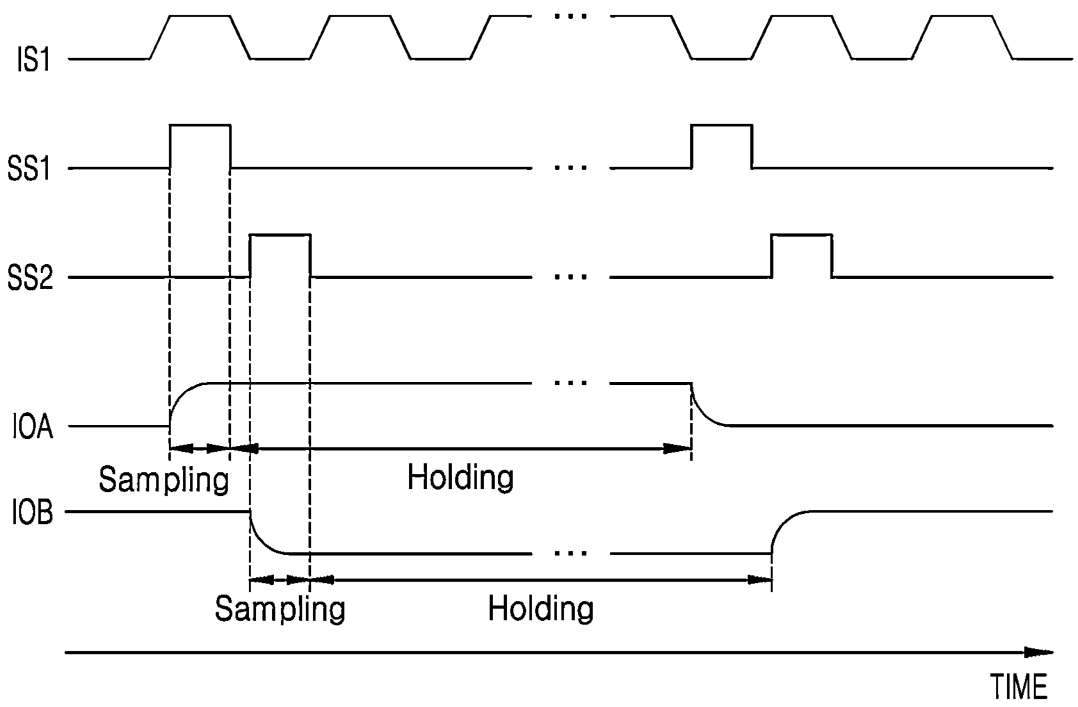
FIG. 3 is a timing diagram illustrating a change in output current according to signals provided to a pixel circuit according to at least one example embodiment.

FIG. 2 is a diagram illustrating the arrangement of a display panel and a pixel driving circuit in a display device according to at least one example embodiment of the inventive concepts. FIG. 3 is a timing diagram illustrating a change in output current according to signals provided to a pixel circuit according to at least one example embodiment. In FIG. 3, a first output current IOA and a second output current IOB according to a first data signal DS1, a first scan signal SS1, and a second scan signal SS2 are illustrated. However, FIG. 3 shows only some signals for convenience of description, but the example embodiments are not limited thereto, and similar description may be applied to other data signals and scan signals.

Referring to FIGS. 1 and 2, pixel circuits 100 may be connected to a plurality of scan lines S1 to Sn extending in a row direction, and a plurality of data lines D1 to Dm crossing the plurality of scan lines S1 to Sn, but the example embodiments are not limited thereto. The pixel circuits 100 may provide an output current JO to the plurality of LED BLUs BLs according to scan signals SS provided through the plurality of scan lines S1 to Sn and image signals IS provided through the plurality of data lines D1 to Dm, etc.

Each of the pixel circuits 100 may provide an output current to a corresponding number of LED BLU BL to drive the LED BLU BL, but the example embodiments are not limited thereto. In addition, each of the pixel circuits 100 is an integrated circuit and may be mounted, by using a surface mount technology (SMT), on a rear surface 30B of the display panel 30 so as to be connected to the plurality of LED BLUs BLs, but the example embodiments are not limited thereto. It may be understood that one pixel circuit 100 and an LED BLU BL corresponding thereto constitute one pixel.

In the display device 10 according to at least one example embodiment of the inventive concepts, as the pixel circuit 100 which provides the output current IO to the LED BLUs BLs, and the pixel driving circuit 200 which provides the image signal IS and the scan signal SS to the pixel circuit 100 are separated from each other, and the pixel circuit 100 is arranged on the rear surface 30B of the display panel 30, the display panel 30 may be driven in an active matrix (AM) method, but is not limited thereto. Accordingly, in comparison with a comparative example including individual LED driving circuits (e.g., a plurality of LED driving circuits) for controlling LED BLUs BLs in a 1:1 manner, the display device 10 includes a reduced number of circuits for driving the display panel 30, including a reduced number of LED BLUs BLs. Thus, an area occupied by the circuits (e.g., the pixel driving circuit 200) for driving the display panel 30 may be reduced, and therefore the manufacturing complexity, efficiency, and/or cost may be reduced. In addition, the display device 10 may improve the contrast performance of the display panel by individually controlling each of the LED BLUs BLs in the display panel 30.

The plurality of scan lines S1 to Sn may be connected to the pixel driving circuit 200 and may transmit the scan signals SS to the pixel circuits 100. The plurality of data lines D1 to Dm may be connected to the pixel driving circuit 200 and may transmit the image signals IS to the pixel circuits 100. The values "n" and "m" may be natural numbers greater than zero.

Although it is illustrated in FIG. 2 that each of the pixel circuits 100 is connected to one scan line and is connected to four data lines (e.g., first to fourth data lines D1 to D4 or (m−3)-th to m-th data lines Dm-3 to Dm), thereby driving four LED BLUs, the display device according to the example embodiments of the inventive concepts are not limited thereto. The number of LED BLUs driven by each of the pixel circuits 100 may be variously changed to a value greater or less than four.

Referring to FIGS. 2 and 3, according to some example embodiments, when a first scan signal SS1 provided through a first scan line SL1 is at a logic high (e.g., logic high level, etc.), the pixel circuit 100 receiving the first scan signal SS1 may sample a first data signal DS1 provided through a first data line DL1, and may start driving an LED BLU BL, but the example embodiments are not limited thereto. Additionally, when the first scan signal SS1 is at a logic low (e.g., logic low level, etc.), the pixel circuit 100 may hold a previously received first data signal DS1 and may drive the LED BLU BL with a constant first output current IOA, but is not limited thereto. Also, when a second scan signal SS2 provided through a second scan line SL2 is at a logic high, the pixel circuit 100 receiving the second scan signal SS2 may sample a first data signal DS1 provided through the first data line DL1 and may start driving an LED BLU BL, etc. And when the second scan signal SS2 is at a logic low, the pixel circuit 100 may hold a previously received first data signal DS1 and may drive the LED BLU BL with a constant second output current JOB, etc., but the example embodiments are not limited thereto.

First to n-th scan signals transmitted to first to n-th scan lines SL1 to SLn may sequentially transition from logic low to logic high and then be maintained at a logic high state for a certain period (and/or a desired period of time) by the pixel driving circuit 200, but the example embodiments are not limited thereto. That is, the pixel driving circuit 200 may sequentially supply a scan-on signal (e.g., a scan signal having a logic high level) to the pixel circuits 100 through the first to n-th scan lines SL1 to SLn, thereby sequentially selecting the scan lines SL1 to SLn, and a grayscale voltage may be applied through first to m-th data lines DL1 to DLm to the pixel circuits 100 connected to selected scan lines, and thus, a display operation may be performed. In a period in which the scan-on signal is not supplied to the first to n-th scan lines SL1 to SLn, a scan-off signal (e.g., a scan signal having a logic low level) may be supplied to the first to n-th scan lines SL1 to SLn by the pixel driving circuit 200, but the example embodiments are not limited thereto.

Figure 4:
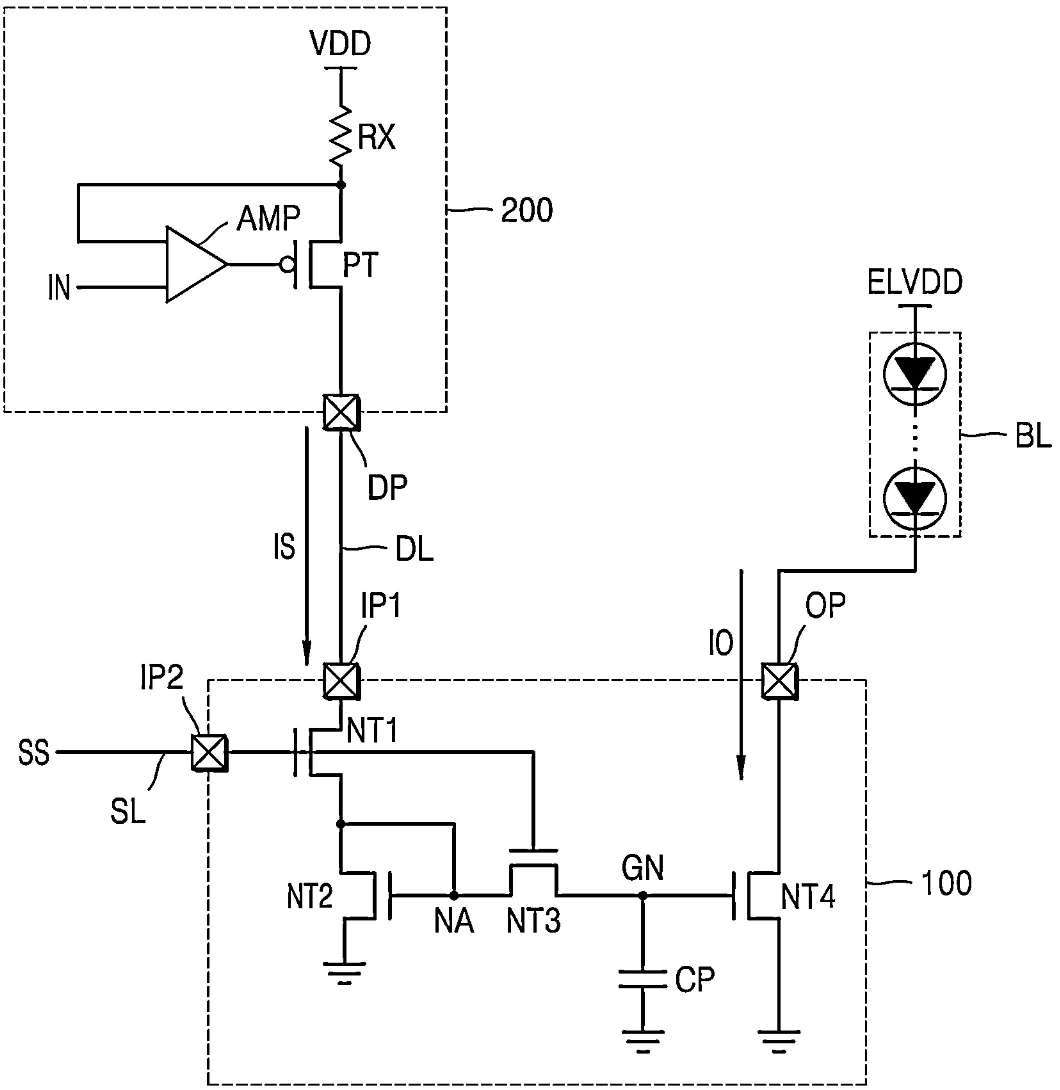
FIG. 4 is a circuit diagram illustrating a light-emitting diode (LED) backlight unit (BLU), a pixel circuit, and a pixel driving circuit according to at least one example embodiment of the inventive concepts.

FIG. 4 is a circuit diagram illustrating an LED BLU, a pixel circuit, and a pixel driving circuit according to at least one example embodiment of the inventive concepts.

Referring to FIG. 4, a pixel driving circuit 200 and a pixel circuit 100 may generate an output current JO using a current mirror method and may supply the output current JO to an LED BLU BL, but the example embodiments are not limited thereto. The LED BLU BL may be connected between a power supply voltage ELVDD terminal and an output pin OP of the pixel circuit 100 and may include a plurality of LEDs, but is not limited thereto.

The pixel driving circuit 200 may include an amplifier AMP, a resistor RX, and/or a P-type transistor PT, etc., but is not limited thereto. The pixel driving circuit 200 may operate as a current source, for example, a voltage controlled current source (VCCS), and may generate an image signal IS corresponding to and/or based on an input voltage IN, but is not limited thereto. The input voltage IN may have a voltage level corresponding to and/or based on the data DATA received from the display controller 400, but is not limited thereto. The image signal IS generated by the pixel driving circuit 200 may have a current (e.g., IS=(VDD−IN)/RX) obtained by dividing, by a resistance value of a resistor RX, a value obtained by subtracting the voltage level of the input voltage IN from the voltage level of the power supply voltage VDD. However, unlike in FIG. 4, the resistor RX may be formed outside the pixel driving circuit 200, but the example embodiments are not limited thereto.

The pixel driving circuit 200 may include at least one data pin DP and may transmit an image signal IS to the pixel circuit 100 through a data line DL connected to the data pin DP, but is not limited thereto. The data line DL may include at least one line resistor and/or at least one line capacitor, etc. For example, the data line DL may be one of the first to m-th data lines DL1 to DLm of FIG. 2, but is not limited thereto.

The pixel circuit 100 may receive the image signal IS through at least one first input pin IP1 connected to the data line DL and may receive a scan signal SS through at least one second input pin IP2 connected to a scan line SL, etc. The pixel circuit 100 may generate an output current IO according to and/or based on the image signal IS and the scan signal SS, etc. For example, the scan line SL may be one of the first to n-th scan lines SL1 to SLn of FIG. 2, but the example embodiments are not limited thereto.

The pixel circuit 100 may include a plurality of transistors, e.g., first to fourth transistors NT1, NT2, NT3, and NT4, etc., and may include at least one capacitor CP connected to at least one gate node GN of a transistor, such as the fourth transistor NT4, but the example embodiments are not limited thereto. For example, the first to fourth transistors NT1, NT2, NT3, and NT4 may be N-type transistors, but are not limited thereto. For example, the capacitor CP may be a parasitic capacitor of the gate node GN, but is not limited thereto.

The scan signal SS received through the scan line SL may be input to one or more gates of a plurality of transistors, such as the first and third transistors NT1 and NT3, and thus, the scan signal SS may be used to control the turning on/off of those transistors (e.g., the first and third transistors NT1 and NT3, etc.), but the example embodiments are not limited thereto. The second transistor NT2 and the fourth transistor NT4 may be connected in the form of a current mirror, but are not limited thereto. The first transistor NT1 may be connected between the first input pin IP1 and a node NA, the second transistor NT2 may be connected between the node NA and a ground terminal, and/or a gate terminal of the second transistor NT2 may be connected to the node NA, but the example embodiments are not limited thereto. The third transistor NT3 may be connected between the node NA and the gate node GN, and/or the fourth transistor NT4 may be connected between the output pin OP and the ground terminal, but are not limited thereto. The fourth transistor NT4 is a driver transistor and may generate an output current IO according to and/or based on the voltage of the gate node GN, but is not limited thereto.

When the scan signal SS is logic high, charges according to the image signal IS may be accumulated (e.g., sampled) in the capacitor CP, etc. When the scan signal SS is logic low, an output current IO according to and/or based on the accumulated charges may be generated, but is not limited thereto. The magnitude of the output current IO flowing through the fourth transistor NT4 that is an N-type transistor may vary according to and/or based on the accumulated charges, etc.

The pixel circuit 100 according to at least one example embodiment of the inventive concepts may include the third transistor NT3 connected between the node NA (e.g., a gate node of the second transistor NT2) and the gate node GN (e.g., a gate node of the fourth transistor NT4), but is not limited thereto. When the first transistor NT1 is turned off by the scan signal SS and the node NA is discharged, the third transistor NT3 is turned off, and thus, a voltage change at the gate node GN of the fourth transistor NT4 due to capacitance between the drain and the gate of the second transistor NT2 may be reduced and/or prevented. That is, when the first transistor NT1 is turned off by the scan signal SS and the node NA is naturally discharged, coupling of the gate node GN may be reduced and/or prevented.

Because the pixel circuit 100 and/or the pixel driving circuit 200 generate the output current IO provided to the LED BLU BL using a current mirror method, a change in the output current IO according to and/or based on a temperature change and/or a process change (e.g., a difference in characteristics of a transistor caused by a process change, etc.) may be small compared with a pixel circuit of a comparative example having a conventional 2T-1C structure. The pixel circuit having a 2T-1C structure of the comparative example has a structure including two transistors and one capacitor. That is, the 2T-1C structure refers to a structure including a storage capacitor, a selection transistor for accumulating charges in the storage capacitor in response to a scan signal, and a driving transistor for generating an output current according to charges accumulated in the storage capacitor. Accordingly, the pixel circuit 100 and/or the pixel driving circuit 200 may generate an output current IO having a constant magnitude even when a temperature change occurs, and/or a process change occurs, and thus the LED BLU BL may have a constant luminance.

Figure 5A:
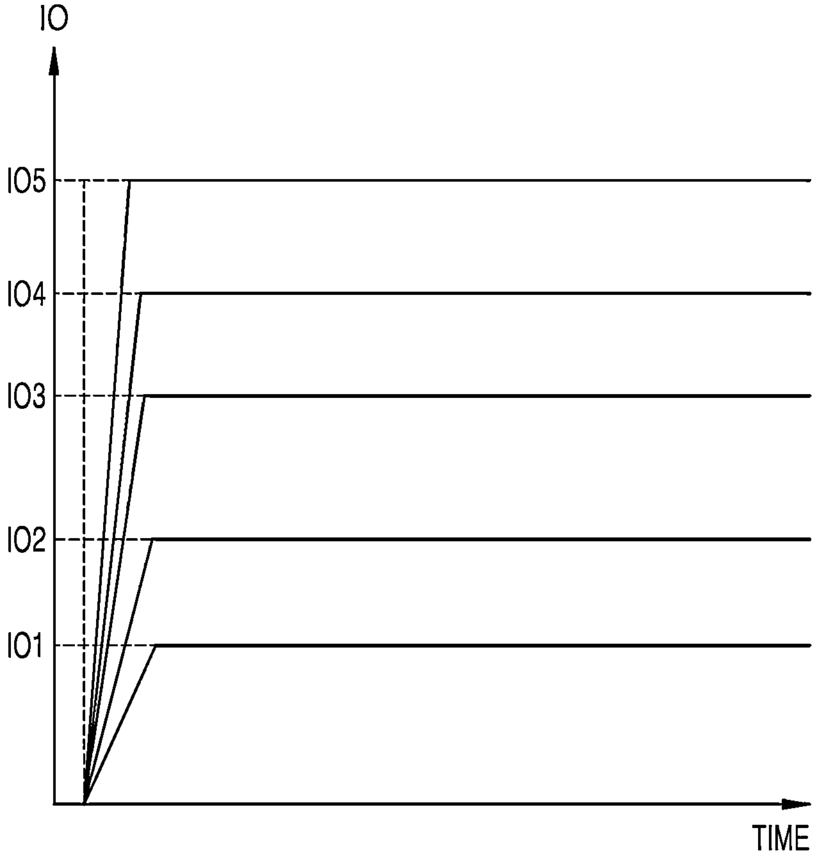
FIGS. 5A and 5B are graphs illustrating a change in the luminance of an LED BLU according to a change in the magnitude of an output current provided to the LED BLU, according to some example embodiments of the inventive concepts.
Figure 5B:
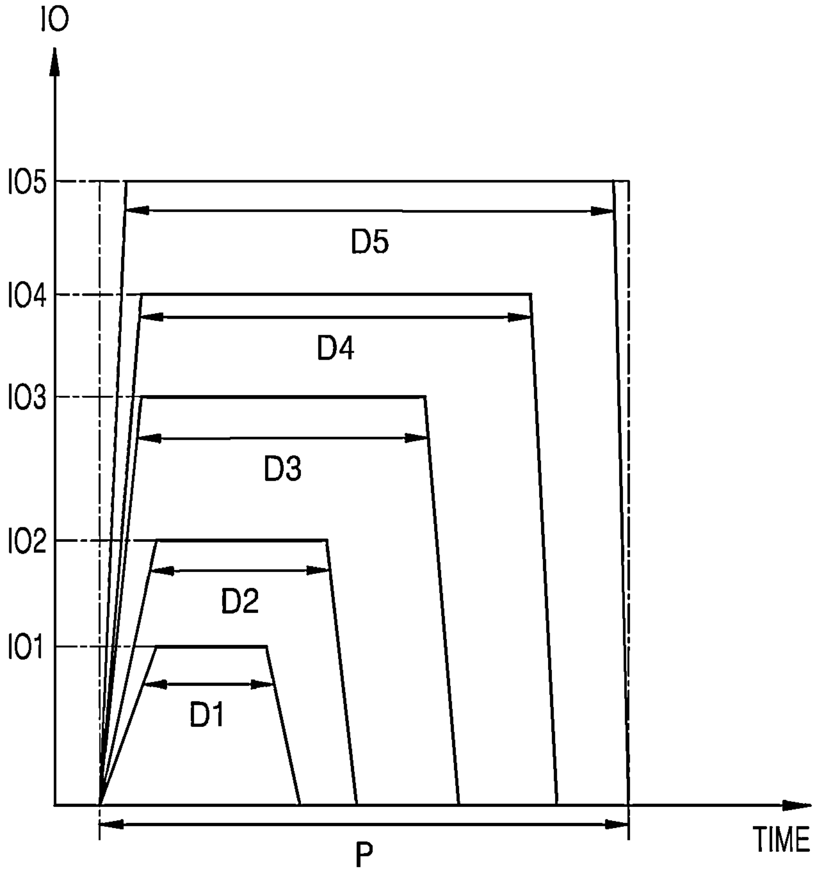

FIGS. 5A and 5B are graphs illustrating a change in the luminance of an LED BLU according to a change in the magnitude of an output current provided to the LED BLU, according to at least one example embodiment of the inventive concepts.

Referring to FIGS. 4 and 5A, according to some example embodiments, the luminance of an LED BLU BL may be controlled and/or adjusted using a pulse amplitude modulation (PAM) driving method by the pixel circuit 100 (and/or the pixel driving circuit 200), but the example embodiments are not limited thereto. The LED BLU BL may emit light having a luminance that varies depending on the intensity of an output current IO generated by the pixel circuit 100, etc., but is not limited thereto. For example, current intensity may increase from a first output current IO1 to, for example, a fifth output current IO5, etc., and as the output current IO provided to the LED BLU BL increases from the first output current IO1 to the fifth output current IO5, the luminance of the LED BLU BL may increase, but the example embodiments are not limited thereto, and for example, there may be a greater or lesser number of output currents, etc.

Referring to FIGS. 4 and 5B, according to some example embodiments, the PAM driving method and a pulse width modulation (PWM) driving method may be simultaneously applied to the LED BLU BL to control the luminance of the LED BLU BL, but the example embodiments are not limited thereto. The LED BLU BL may emit light having a luminance that varies depending on the intensity of the output current IO, and/or may emit light having a luminance that varies depending on a time period for which the output current IO is provided to the LED BLU BL, etc. For example, based on a certain period P, the first output current IO1 may be provided for a first time period D1, the second output current IO2 may be provided for a second time period D2, the third output current IO3 may be provided for a third time period D3, the fourth output current IO4 may be provided for a fourth time period D4, and/or the fifth output current IO5 may be provided for a fifth time period D5, etc., but the example embodiments are not limited thereto, and for example, there may be a greater or lesser number of output currents and/or time periods than five. The current intensity may increase from, for example, the first output current IO1 to the fifth output current IO5, etc., and a time period for which a current is provided may increase. Accordingly, as the output current IO provided to the LED BLU BL increases from the first output current IO1 to the fifth output current IO5, etc., the luminance of the LED BLU BL may increase.

Compared to controlling the luminance of the LED BLU BL by using only the PAM driving method, when controlling the luminance of the LED BLU BL by using both the PAM driving method and the PWM driving method, the resolution of luminance control may be improved and the luminance of the LED BLU BL may be precisely controlled. However, unlike in FIGS. 5A and 5B, a display device according to at least one example embodiment of the inventive concepts may adjust the luminance of the LED BLU BL by using only the PWM method (e.g., a method of controlling a time period for which a current flows while maintaining current intensity), etc.

Figure 6:
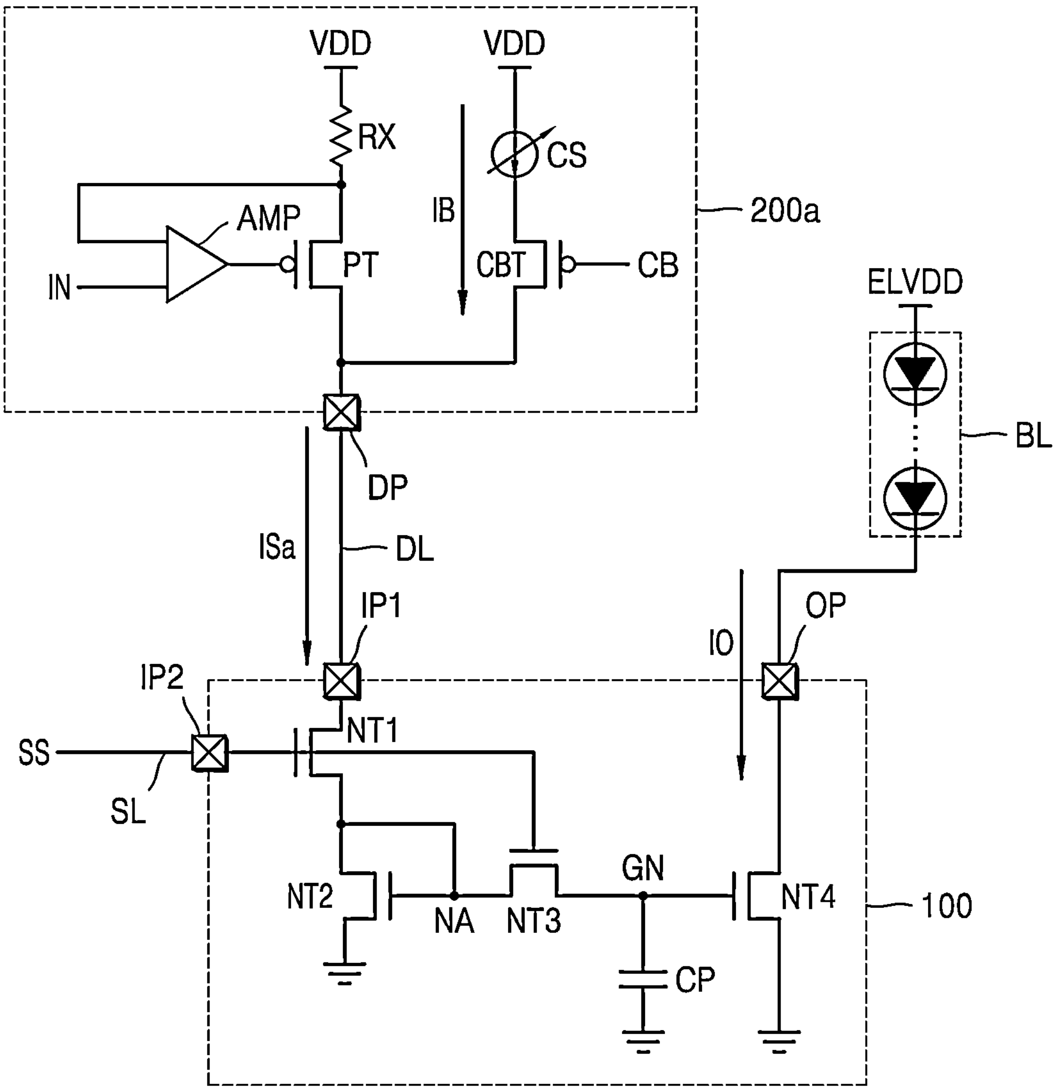
FIG. 6 is a circuit diagram illustrating an LED BLU, a pixel circuit, and a pixel driving circuit according to at least one example embodiment of the inventive concepts.
Figure 7A:
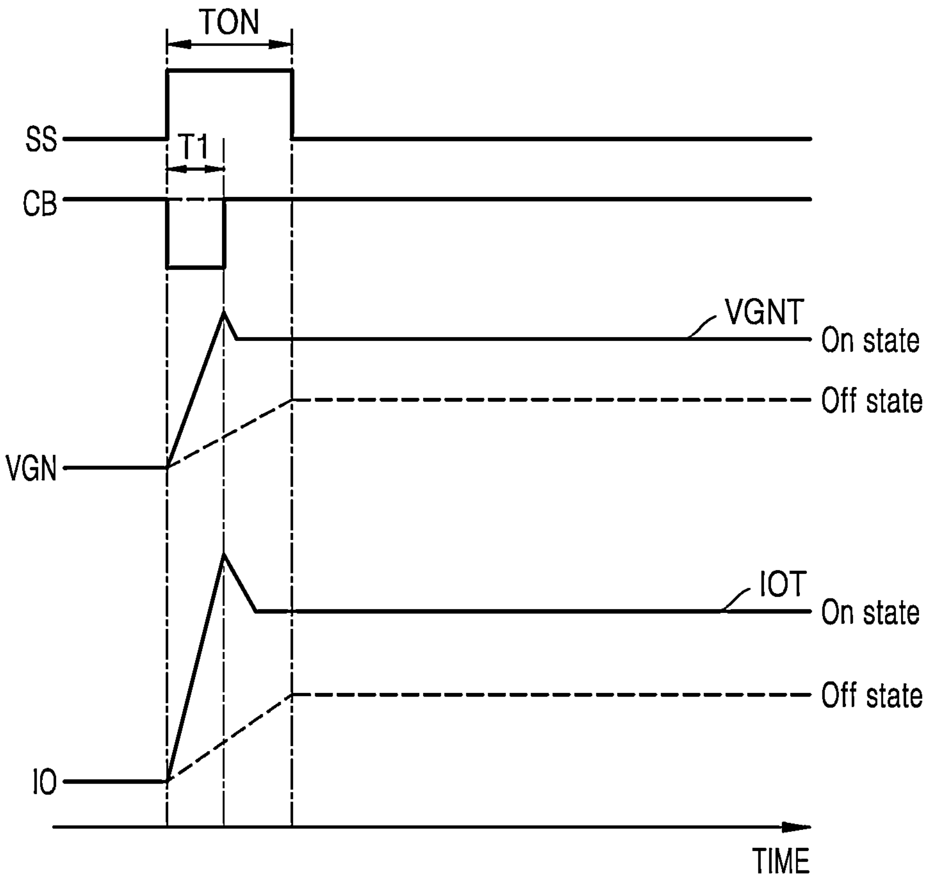
FIGS. 7A and 7B are timing diagrams illustrating changes in a gate node voltage and an output voltage according to a boosting signal according to some example embodiments.
Figure 7B:
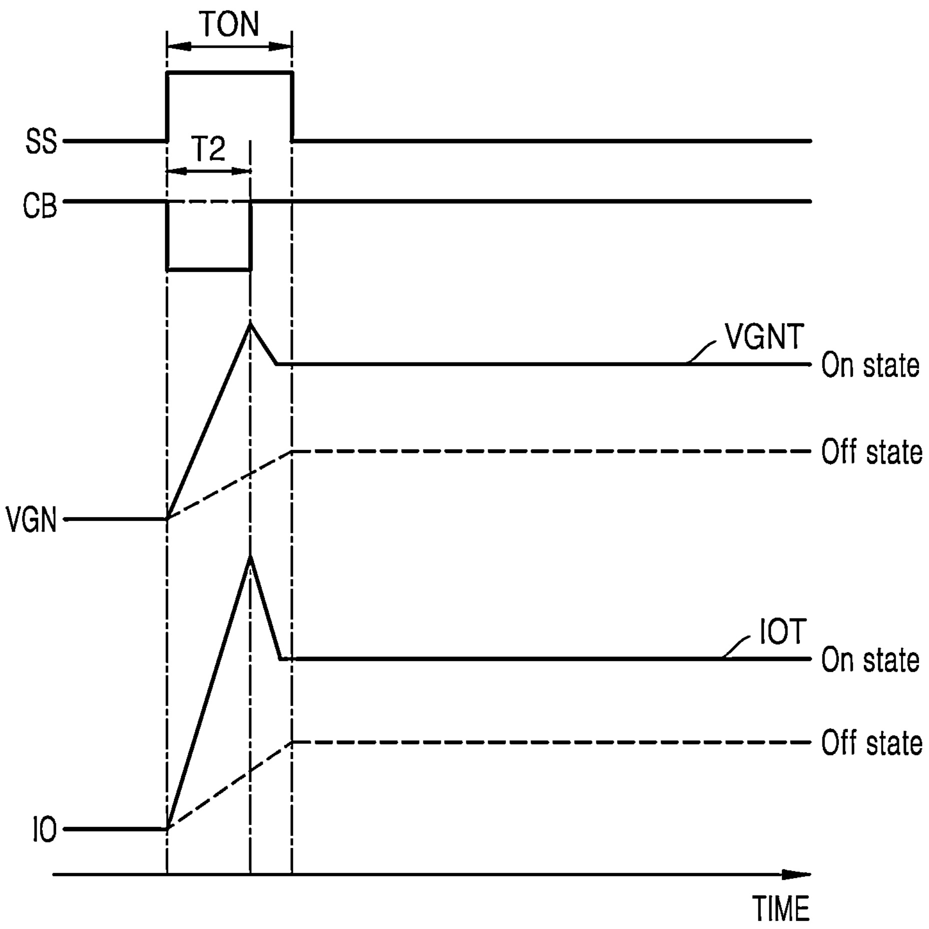

FIG. 6 is a circuit diagram illustrating an LED BLU, a pixel circuit, and a pixel driving circuit according to at least one example embodiment of the inventive concepts. FIGS. 7A and 7B are timing diagrams illustrating changes in a gate node voltage and an output voltage according to a boosting signal. With respect to FIG. 6, redundant descriptions of the same reference numerals as in FIG. 4 are omitted.

Referring to FIG. 6, a pixel driving circuit 200*a* may further include a current boosting circuit, when compared to the pixel driving circuit 200 of FIG. 4, but the example embodiments are not limited thereto. The current boosting circuit may include a current source CS and/or a transistor CBT that is connected in series to the current source CS and operates in response to a boosting signal CB, etc., but is not limited thereto. In at least one example embodiment, the current source CS may be a variable current source, and the transistor CBT may be a P-type transistor, but the example embodiments are not limited thereto. In at least one example embodiment, the boosting signal CB may be provided from the display controller 400 of FIG. 1, but is not limited thereto.

The transistor CBT may be connected to a data pin DP, and when the transistor CBT is turned on (e.g., in response to the transistor CBT being turned on), a boosting current IB may be provided to the data pin DP. Accordingly, an image signal ISa output to the data pin DP may have a value obtained by adding a current generated by an input voltage IN to the boosting current IB, etc.

Referring to FIGS. 6 and 7A, according to at least one example embodiment, the boosting signal CB may have a logic low level during a first boosting period T1, and accordingly, the transistor CBT may be turned on during the first boosting period T1, but the example embodiments are not limited thereto. The first boosting period T1 may be included in an on-period TON in which a scan signal SS is at a logic high level, and the current boosting circuit may generate the boosting current IB while charges are accumulated in a capacitor CP, but the example embodiments are not limited thereto.

During an on state for the boosting circuit, the boosting current IB is additionally generated by the boosting circuit during the first boosting period T1 of the transistor CBT, a gate node voltage VGN of a gate node GN may increase relatively quickly compared to an off state of the boosting circuit during which the transistor CBT is turned off and the boosting current IB is not generated, etc. As the intensity of a current flowing into the capacitor CP increases, the rate at which charges are accumulated in the capacitor CP may increase (e.g., an accumulation time may decrease), and the rate at which the gate node voltage VGN increases may increase. Because the gate node voltage VGN increases relatively quickly due to the boosting current IB, the output current IO may also increase faster than when the boosting current IB is not generated, etc.

The transistor CBT may be turned off before the scan signal SS transitions to logic low, but the example embodiments are not limited thereto. That is, the first boosting period T1 of the boosting signal CB may end before the on-period TON of the scan signal SS ends, etc. When the first boosting period T1 ends, the gate node voltage VGN may be maintained at a target voltage level VGNT corresponding to and/or based on a current generated by the input voltage IN, from which the boosting current IB is excluded, but the example embodiments are not limited thereto. When the gate node voltage VGN reaches the target voltage level VGNT, the output current IO may reach a target current level IOT, etc.

On the other hand, during an off state of the boosting circuit in which the boosting current IB is not generated, when the on-period TON of the scan signal SS is not long enough (e.g., is less than a desired threshold time period, etc.), the gate node voltage VGN may not reach the target voltage level VGNT, and accordingly, the output current IO may not reach the target current level IOT, etc. Accordingly, it may be desired to maintain the on-period TON of the scan signal SS long enough to make the output current IO reach the target current level IOT, etc. In addition, when the boosting current IB is not provided, a time taken for the gate node voltage VGN to reach the target voltage level VGNT may vary due to a change in temperature, a change in the threshold voltage of the fourth transistor NT4, and/or a change in the capacitance of the capacitor CP, etc. In addition, in some cases, the output current IO may not reach the target current level IOT within a desired and/or predetermined time, and an operation speed may be slow.

Accordingly, the pixel driving circuit 200*a* according to at least one example embodiment of the inventive concepts may further include a boosting circuit for controlling the output current IO and causing the output current IO to quickly reach the target current level IOT, thereby decreasing and/or preventing the magnitude of the output current IO from being changed due to a change in temperature, a change in the threshold voltage of the fourth transistor NT4, and/or a change in the capacitance of the capacitor CP, etc.

Referring to FIGS. 6, 7A, and 7B, in at least one example embodiment, the length of an on-period in which the transistor CBT of the boosting circuit is turned on may be adjusted based on a boosting signal CB, etc., but the example embodiments are not limited thereto. For example, the boosting signal CB may have a logic low level during a second boosting period T2 longer than the first boosting period T1, and accordingly, the transistor CBT may be in an on state during the second boosting period T2, etc. The second boosting period T2 may be included in the on-period TON in which the scan signal SS is at a logic high level, and the transistor CBT may be in an off state before the scan signal SS transitions to a logic low level, etc.

In at least one example embodiment, the magnitude of the boosting current IB generated from the current source CS may be adjusted. For example, the magnitude of the boosting current IB may be adjusted by a digital code, but the example embodiments are not limited thereto. As the magnitude of the boosting current IB increases, the rate at which the gate node voltage VGN increases may increase, and the output current IO may also increase rapidly.

For example, when the number of pixel circuits 100 connected to a data line DL connected to the pixel driving circuit 200*a* is increased, an equivalent capacitance at a data pin DP of the pixel driving circuit 200*a* may also increase. A display device according to at least one example embodiment of the inventive concepts may control the output current IO such that the output current IO reaches the target current level IOT within a desired and/or predetermined time by increasing the boosting current IB generated by the current source CS and/or increasing the length of an on-period in which the transistor CBT of the boosting circuit is turned on, etc.

Figure 8:
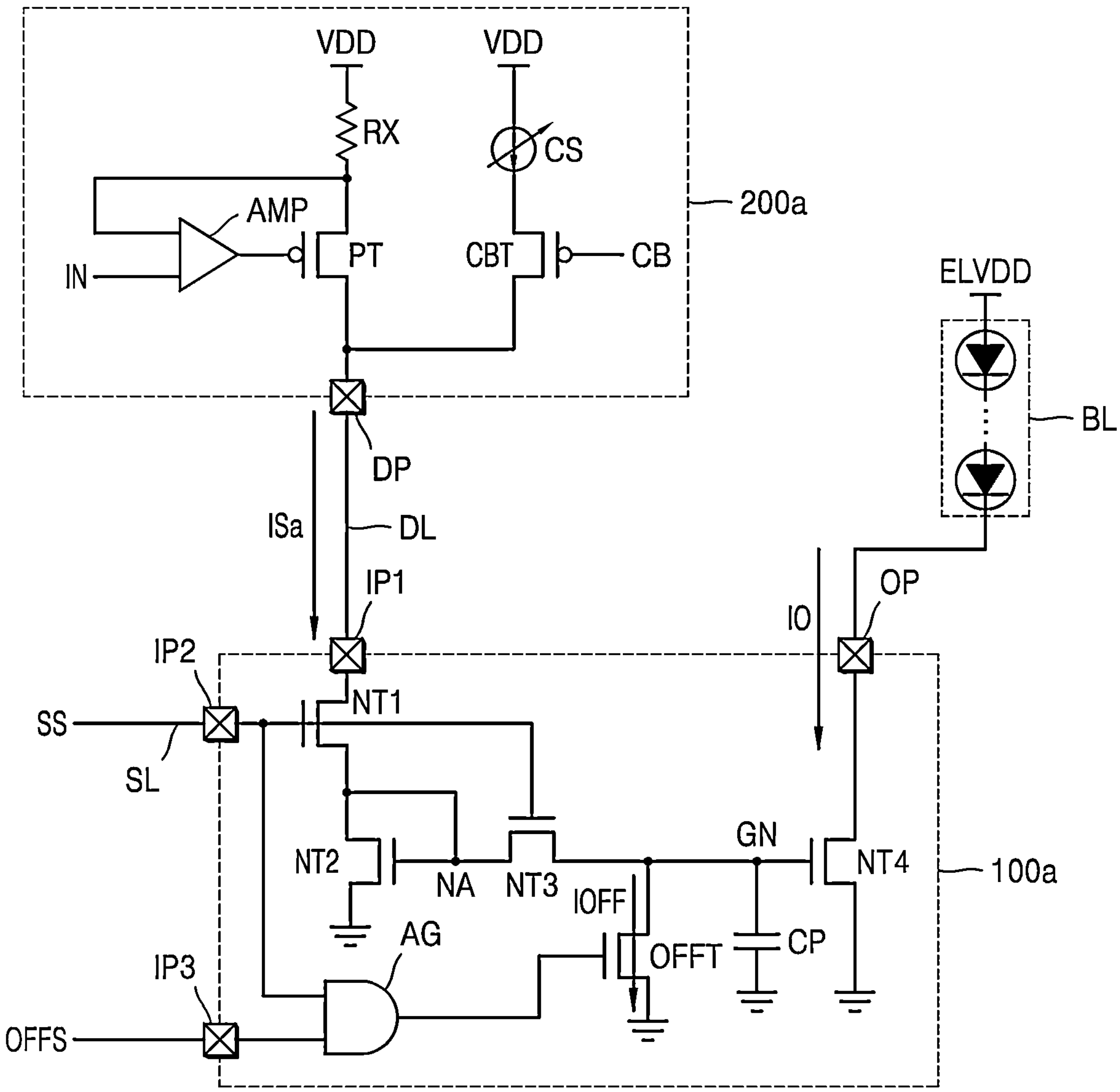
FIG. 8 is a circuit diagram illustrating an LED BLU, a pixel circuit, and a pixel driving circuit according to at least one example embodiment of the inventive concepts.
Figure 9:
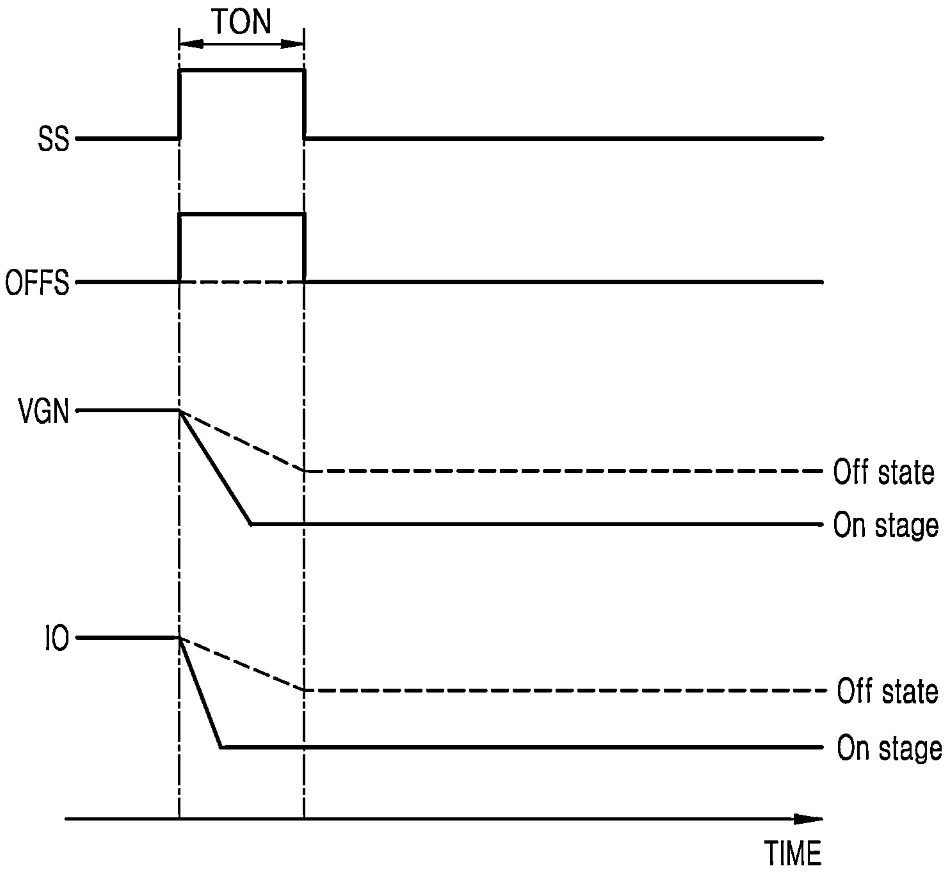
FIG. 9 is a timing diagram illustrating changes in a gate node voltage and an output voltage according to a de-ghost signal according to at least one example embodiment.

FIG. 8 is a circuit diagram illustrating an LED BLU, a pixel circuit, and a pixel driving circuit according to at least one example embodiment of the inventive concepts. FIG. 9 is a timing diagram illustrating changes in a gate node voltage and an output voltage according to a de-ghost signal. With respect to FIG. 8, redundant descriptions of reference numerals that are the same as those in FIGS. 4 and 6 are omitted.

Referring to FIG. 8, a pixel circuit 100*a* may further include a de-ghost circuit when compared to the pixel circuit 100 of FIG. 4, but the example embodiments are not limited thereto. The de-ghost circuit may discharge a gate node GN in response to a de-ghost signal OFFS, but is not limited thereto. That is, charges accumulated in a capacitor CP connected to the gate node GN may be discharged, etc. The de-ghost signal OFFS may be provided from a pixel driving circuit 200*a* to the pixel circuit 100*a*, but the example embodiments are not limited thereto.

In at least one example embodiment, the de-ghost circuit may include an AND gate AG and/or a de-ghost transistor OFFT, etc. The AND gate AG may receive the de-ghost signal OFFS on a third input pin IP3 of the pixel circuit 100*a*, may a scan signal SS, and may provide the de-ghost transistor OFFT with an output signal obtained by logically multiplying the de-ghost signal OFFS and the scan signal SS together, but the example embodiments are not limited thereto. The de-ghost transistor OFFT may be turned on or off in response to the output signal of the AND gate AG, and when the de-ghost transistor OFFT is turned on, the gate node GN may be discharged while an off current IOFF flows through the de-ghost transistor OFFT, but the example embodiments are not limited thereto.

Referring to FIGS. 8 and 9, according to at least one example embodiment, during an on state of the de-ghost circuit, the de-ghost signal OFFS may have a logic high level during an on-period TON of the scan signal SS, etc. In at least one example embodiment, when the pixel driving circuit 200*a* outputs an image signal ISa having a current of 0 mA and outputs the scan signal SS having a logic high level, the pixel driving circuit 200*a* may generate and output the de-ghost signal OFFS having a logic high level to the pixel circuit 100*a*, but the example embodiments are not limited thereto.

In at least one example embodiment, the de-ghost circuit may synchronize the de-ghost signal OFFS with the scan signal SS, but the example embodiments are not limited thereto. For example, when the de-ghost signal OFFS is at a logic high level, the de-ghost transistor OFFT is turned on, and a gate node voltage VGN of the gate node GN may rapidly decrease while the off current IOFF flows through the de-ghost transistor OFFT, etc. The capacitor CP may be completely discharged during the on-period TON of the scan signal SS, and the output current JO may reach 0 mA, etc.

On the other hand, in a pixel circuit without the de-ghost circuit and/or during an off state of the de-ghost circuit, even when the image signal ISa has a current of 0 mA, a voltage at the gate terminal of a second transistor NT2 may not fall below the threshold voltage (e.g., desired threshold voltage, etc.) of the second transistor NT2. In addition, the discharge rate of the gate node GN may be relatively slow, and it may be difficult for the output current JO to be 0 mA. Accordingly, an LED BLU BL may emit light due to a residual current of the output current IO, and an undesirable afterimage may be displayed on the display panel, etc.

Accordingly, the pixel circuit 100*a* according to at least one example embodiment of the inventive concepts includes a de-ghost circuit, and thus, when the image signal ISa has a current of 0 mA, the output current IO may be controlled to be 0 mA, and an afterimage may be reduced and/or prevented from being generated because the LED BLU BL is turned off, etc.

Figure 10:
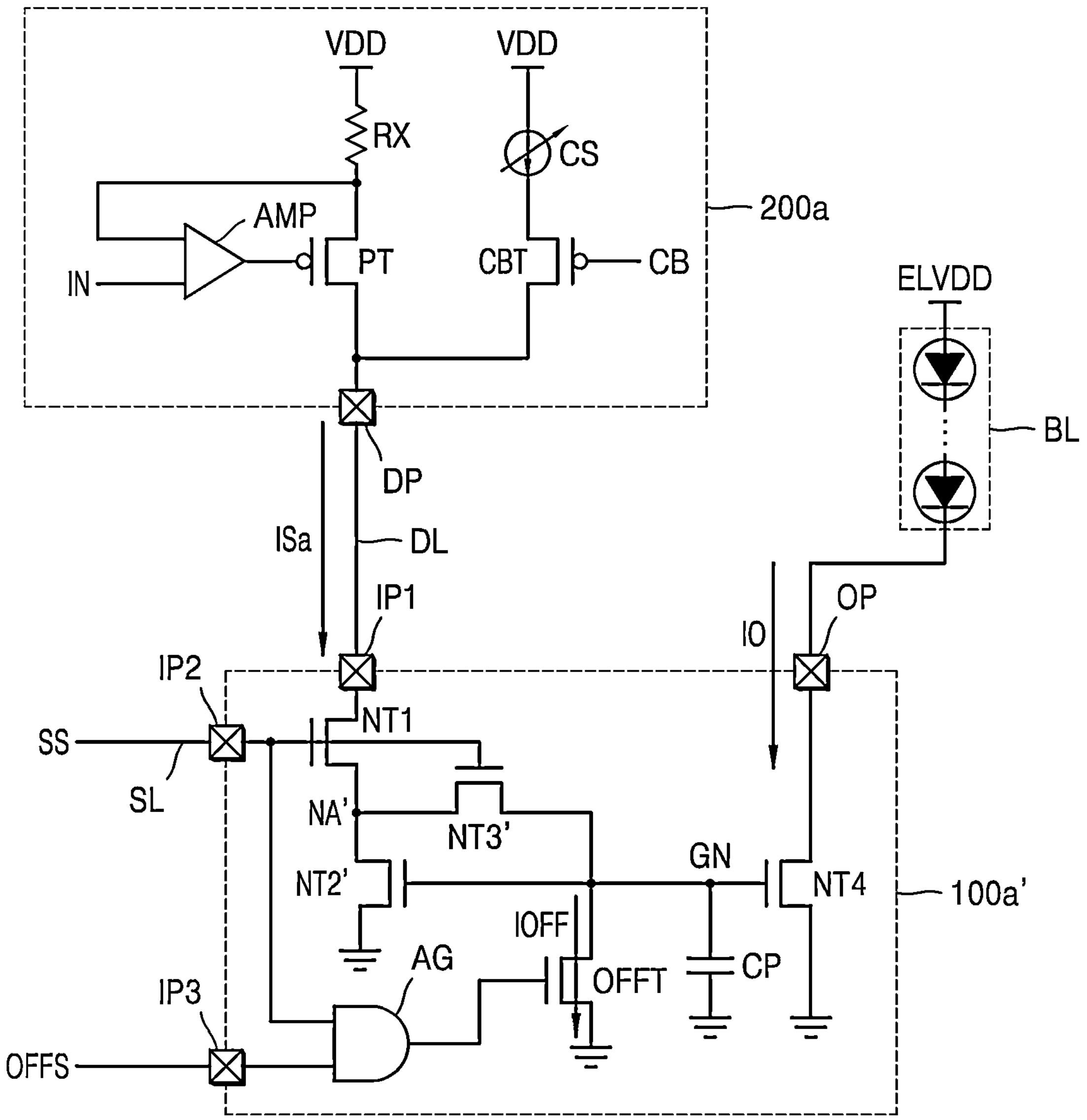
FIG. 10 is a circuit diagram illustrating an LED BLU, a pixel circuit, and a pixel driving circuit according to at least one example embodiment of the inventive concepts.

FIG. 10 is a circuit diagram illustrating an LED BLU, a pixel circuit, and a pixel driving circuit according to at least one example embodiment of the inventive concepts. With respect to FIG. 10, redundant descriptions of reference numerals that are the same as those in FIGS. 4, 6, and 8 are omitted.

Referring to FIG. 10, a pixel circuit 100*a*' may include a plurality of transistors, such as first to fourth transistors NT1, NT2', NT3', and NT4, etc., and a capacitor CP connected to a gate node GN of the fourth transistor NT4, etc., but the example embodiments are not limited thereto, and for example, the pixel circuit may include a greater or lesser number of transistors, and/or capacitors, etc. For example, the first to fourth transistors NT1, NT2', NT3', and NT4 may be N-type transistors, but are not limited thereto.

A scan signal SS received through a scan line SL may be input to the gate terminals of the, e.g., first and third transistors NT1 and NT3', and thus, turning the first transistor NT1 on/off and the third transistor NT3' on/off may be controlled using the scan signal SS. The second transistor NTT and the fourth transistor NT4 may be connected in the form of a current mirror, but the example embodiments are not limited thereto. The first transistor NT1 may be connected between a first input pin IP1 and a node NA', the second transistor NT2' may be connected between the node NA' and a ground terminal, and/or the gate terminal of the second transistor NT2' may be connected to the gate node GN of the fourth transistor NT4, etc. The third transistor NT3' may be connected between the node NA' and the gate node GN, and the fourth transistor NT4 may be connected between an output pin OP and the ground terminal, etc.

When the scan signal SS is logic high, charges according to an image signal IS may be accumulated (e.g., sampled. etc.) in the capacitor CP. When the scan signal SS is logic low, an output current IO according to and/or based on the accumulated charges may be generated. The magnitude of the output current IO flowing through the fourth transistor NT4 that is an N-type transistor may vary according to and/or based on the accumulated charges, but the example embodiments are not limited thereto.

The current mirror structure in each of the pixel circuits 100, 100*a*, and 100*a*' shown in FIGS. 4, 6, 8, and 10 are examples and may be implemented with various current mirror structures, etc. For example, the fourth transistor NT4 generating the output current IO may be an N-type transistor or a P-type transistor, etc. In addition, an LED BLU BL may be connected to a power supply voltage terminal and may receive a power supply voltage ELVDD, or may be connected to a ground voltage terminal receiving a ground voltage, etc.

Figure 11:
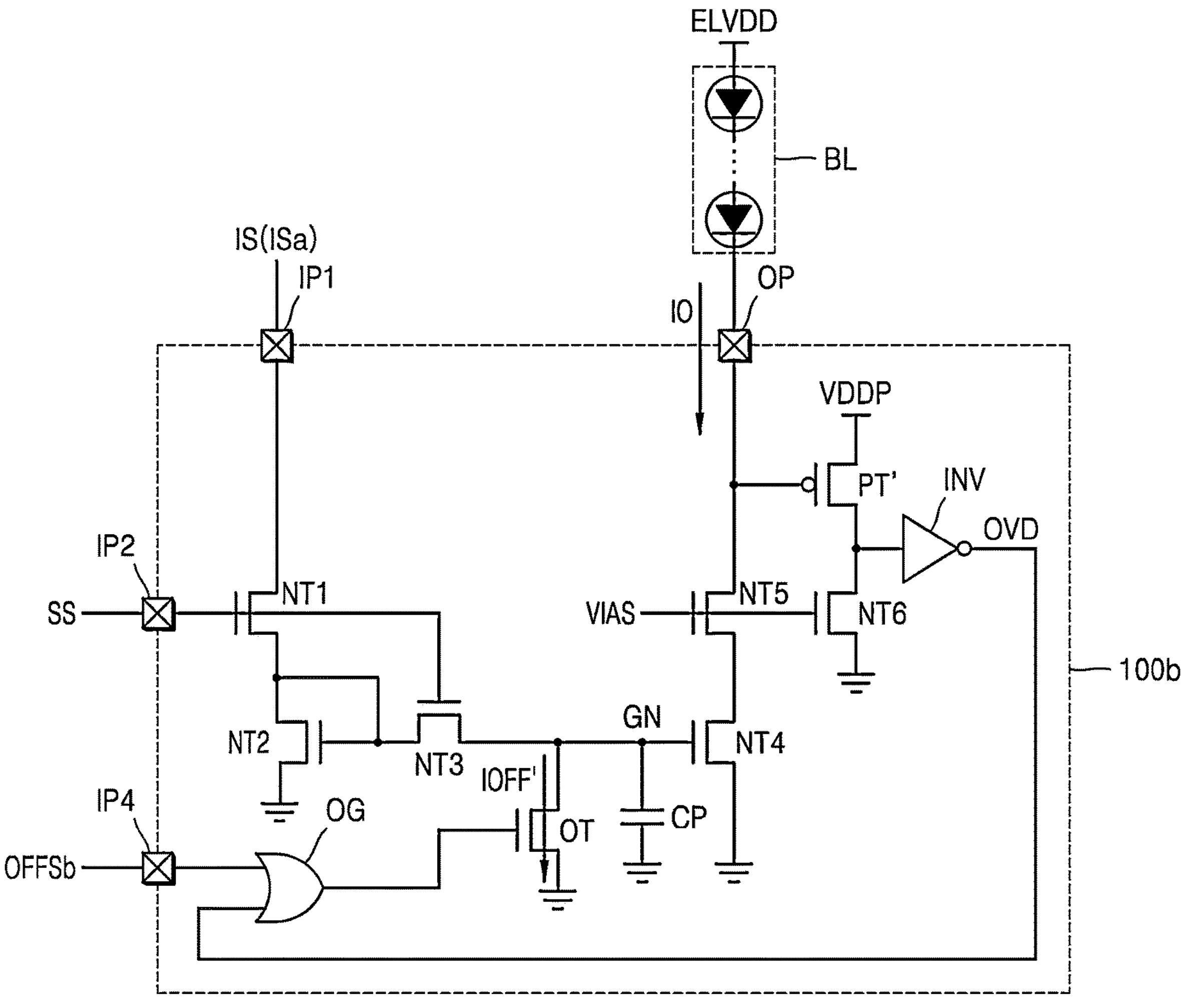
FIG. 11 is a circuit diagram illustrating an LED BLU and a pixel circuit according to at least one example embodiment of the inventive concepts.

FIG. 11 is a circuit diagram illustrating an LED BLU and a pixel circuit according to at least one example embodiment of the inventive concepts. With reference to FIG. 11, redundant descriptions of reference numerals that are the same as those in FIGS. 4 and 8 are omitted.

Referring to FIG. 11, a pixel circuit 100*b* may further include an overvoltage detection circuit, when compared to the pixel circuit 100 of FIG. 4, but the example embodiments are not limited thereto. The overvoltage detection circuit may discharge a gate node GN in response to an off control signal OFFSb, etc. That is, the overvoltage detection circuit may discharge charges accumulated in a capacitor CP connected to the gate node GN. Also, the overvoltage detection circuit may discharge the gate node GN when the voltage of an output pin OP exceeds a reference voltage (e.g., a desired reference voltage, etc.), but the example embodiments are not limited thereto. For example, the reference voltage may be a voltage value obtained by subtracting the threshold voltage of a P-type transistor PT' from an internal power supply voltage VDDP, but is not limited thereto.

In at least one example embodiment, the overvoltage detection circuit may include an OR gate OG, an off transistor OT, a fifth transistor NT5, a sixth transistor NT6, the P-type transistor PT', and/or an inverter INV, etc., but the example embodiments are not limited thereto. The OR gate OG may provide the off transistor OT with an output signal obtained by performing an OR operation of the OFF control signal OFFSb received from, e.g., a fourth input pin IP4, etc., of the pixel circuit 100*b* and an overvoltage detection signal OVD received by the inverter INV, but the example embodiments are not limited thereto. The off transistor OT may be turned on or off in response to an output signal of the OR gate OG, and when the off transistor OT is turned on, the gate node GN may be discharged while an off current IOFF' flows through the off transistor OT, etc. Accordingly, when at least one of the off control signal OFFSb and the overvoltage detection signal OVD is logic high, the gate node GN may be discharged and the fourth transistor NT4 may be turned off.

The fifth transistor NT5 and the sixth transistor NT6 may be N-type transistors, and a bias may be input to the gates of the fifth transistor NT5 and the sixth transistor NT6 to maintain the fifth transistor NT5 and the sixth transistor NT6 in an on state, but the example embodiments are not limited thereto. The fifth transistor NT5 may be connected between the fourth transistor NT4 and the output pin OP, and the sixth transistor NT5 may be connected between the P-type transistor PT' and a ground terminal, etc.

The voltage of the output pin OP may be applied to the gate of the P-type transistor PT', and when the voltage of the output pin OP is greater than a voltage obtained by subtracting the threshold voltage of the P-type transistor PT' from the internal power supply voltage VDDP of the pixel circuit 100*b*, the P-type transistor PT' may be turned off, but the example embodiments are not limited thereto. When the P-type transistor PT' is turned off, the overvoltage detection signal OVD may have a logic high level by the inverter INV, and the gate node GN may be discharged, etc. The fourth transistor NT4 may be turned off, and an output current IO flowing to the output pin OP may be blocked. Accordingly, the pixel circuit 100*b* may block the output current IO by discharging the gate node GN when the voltage of the output pin OP exceeds a reference voltage (e.g., a desired reference voltage, etc.) due to a short circuit of an LED BLU BL, etc.

When the voltage of the output pin OP is less than a reference voltage (e.g., the voltage obtained by subtracting the threshold voltage of the P-type transistor PT' from the internal power supply voltage VDDP of the pixel circuit 100*b*, etc.), the P-type transistor PT' may be turned on, and the off transistor OT may be turned off. The output current IO may flow through the output pin OP, and the LED BLU BL may emit light.

Figure 12:
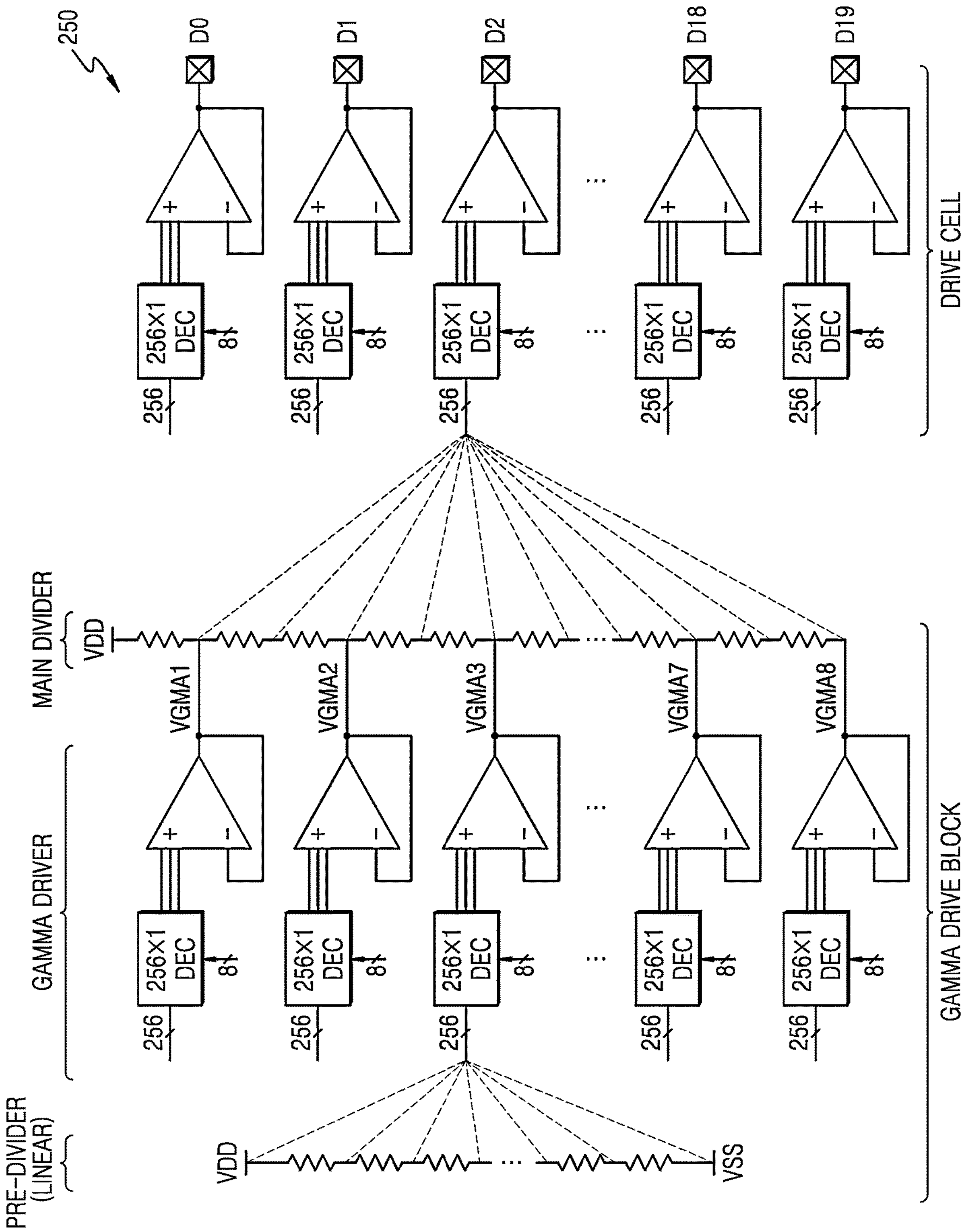
FIG. 12 is a circuit diagram of a grayscale voltage generator in a display device according to at least one example embodiment of the inventive concepts.

FIG. 12 is a circuit diagram of a grayscale voltage generator in a display device according to at least one example embodiment of the inventive concepts.

Referring to FIGS. 1 and 12, according to at least one example embodiment, the display device 10 may include a grayscale voltage generator 250 which converts a pixel value into a grayscale voltage corresponding to a grayscale value represented by the pixel value. A voltage selected from among a plurality of grayscale voltages generated by the grayscale voltage generator 250 may be provided to the pixel driving circuit 200, etc. The selected voltage may be provided to the pixel driving circuit 200 as the input voltage IN of FIG. 4, but the example embodiments are not limited thereto. The grayscale voltage generator 250 may generate a plurality of grayscale voltages. For example, the grayscale voltage generator 250 may generate 256 grayscale voltages, but is not limited thereto.

The grayscale voltage generator 250 may include a pre-divider, a gamma driver, and/or a main divider, etc., which are included in a gamma drive block, but the example embodiments are not limited thereto. The pre-divider may generate a plurality of grayscale voltages, e.g., 256 grayscale voltages, etc. The plurality of grayscale voltages may be used as a plurality of gamma taps by using resistors connected between a power supply voltage VDD and a ground voltage VSS. The plurality of gamma taps may refer to a certain grayscale value (e.g., a desired grayscale value, etc.) which determines a gamma curve from among the plurality of grayscales, for example, a plurality of reference grayscales, etc.

The gamma driver may select and output a voltage corresponding to and/or based on a gamma tap value from among the plurality of grayscale voltages, e.g., the 256 grayscale voltages, etc., output from the pre-divider, but the example embodiments are not limited thereto. An amplifier in the gamma driver may output more than the plurality of grayscale voltages, e.g., more than 256 grayscale voltages (e.g., 1024 grayscale voltages, etc.) through input interpolation, but the example embodiments are not limited thereto.

The main divider may receive a plurality of gamma tap voltages, e.g., VGMA1 to VGMA8, etc., output from the gamma driver, and the main divider may include resistors connected between the power supply voltage VDD and the ground voltage VSS, etc. The main divider may generate a plurality of grayscale voltages, e.g., 256 grayscale voltages, but is not limited thereto.

A drive cell may generate an input voltage (e.g., the input voltage IN of FIG. 4, etc.) by using the generated plurality of grayscale voltages (e.g., the 256 grayscale voltages), but the example embodiments are not limited thereto. A corresponding input voltage IN may be output to each of a plurality of output terminals, e.g., first to twentieth output terminals DO to D19, etc.

In at least one example embodiment, an amplifier in the display device may generate an intermediate voltage between a first input voltage of the amplifier and a second input voltage of the amplifier through an interpolation function, but is not limited thereto. When the interpolation function is used, the physical size of a decoder may be reduced and/or the number of gamma lines may be reduced, and thus, the overall chip size of the grayscale voltage generator 250 may be reduced.

For example, when a plurality of input voltages, e.g., first to fourth input voltages, etc., are input to the amplifier and all of the input voltages, e.g., first to fourth input voltages, are at a low level, the output voltage of the amplifier has a low level, but the example embodiments are not limited thereto. When all of the input voltages, e.g., first to fourth input voltages, are at a high level, the output voltage of the amplifier has a high level. When one of the input voltages, e.g., first to fourth input voltages, is at a high level, the output voltage of the amplifier has a value obtained by dividing a high level and a low level by a ratio of, e.g., 1:3, but is not limited thereto. When two of the input voltages, e.g., first to fourth input voltages are at a high level, the output voltage of the amplifier has a value obtained by dividing a high level and a low level by a ratio of, e.g., 1:1, etc. When three of the input voltages, e.g., first to fourth input voltages, are at a high level, the output voltage of the amplifier may have a value obtained by dividing a high level and a low level by a ratio of, e.g., 3:1, etc.

Figure 13A:
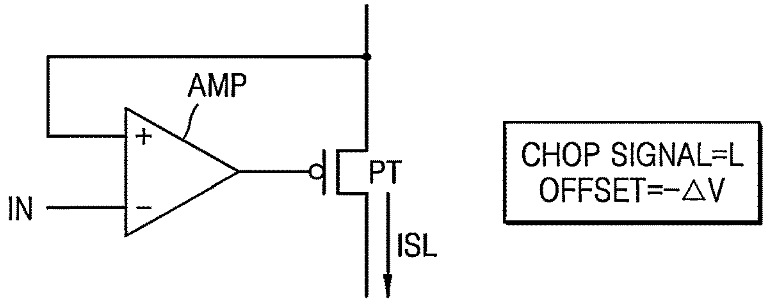
FIGS. 13A to 13C are diagrams illustrating an offset of an amplifier in a pixel driving circuit of a display device according to some example embodiments of the inventive concepts.
Figure 13B:
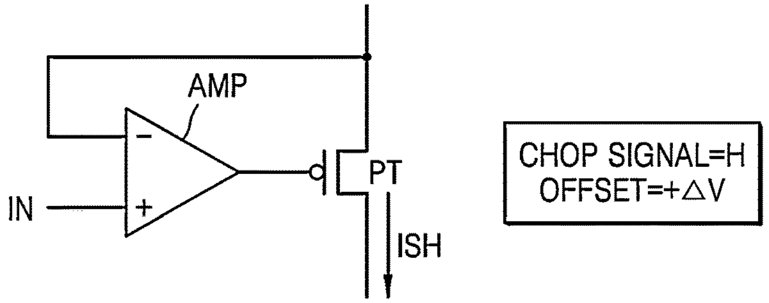
Figure 13C:
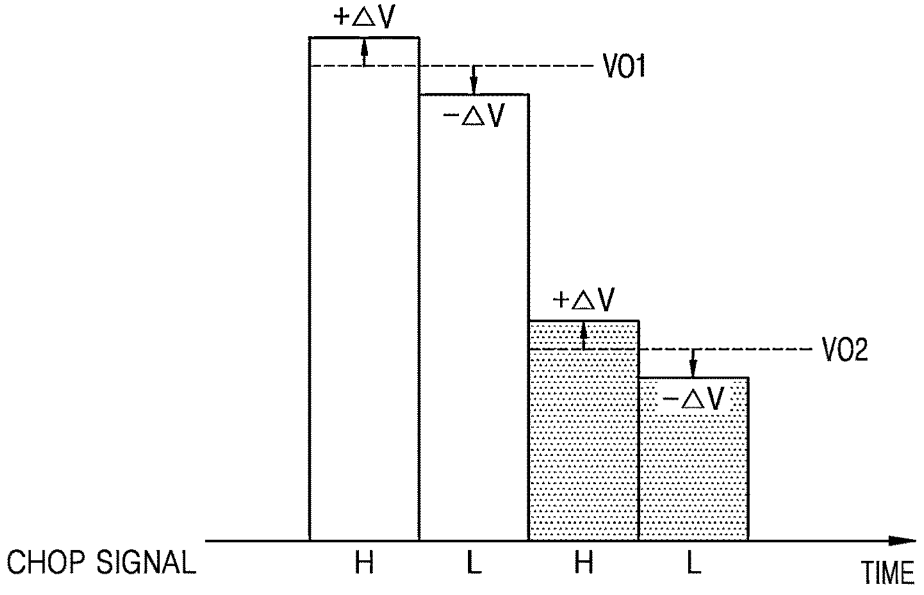

FIGS. 13A to 13C are diagrams illustrating an offset of an amplifier in a pixel driving circuit of a display device according to at least one example embodiment of the inventive concepts.

Referring to FIGS. 13A to 13C, an output offset of an amplifier AMP in a pixel driving circuit may occur depending on whether an input voltage IN is input to a (+) input terminal or a (−) input terminal of the amplifier AMP. Due to this offset, the magnitude of the current of an image signal ISL or ISH may vary, and the magnitude of an output current (e.g., the output current IO of FIG. 4) provided to an LED BLU may also vary, but the example embodiments are not limited thereto.

Accordingly, in the display device according to at least one example embodiment of the inventive concepts, the output offset may be averaged to 0 over time by crossing the input terminal of the amplifier AMP in units of frames and/or crossing the input terminal of the amplifier AMP in units of lines to which the input voltage IN is applied, etc. For example, when a chop signal is logic low, the input voltage IN may be applied to the (−) input terminal of the amplifier AMP, and a first offset ($-\Delta V$) may occur at the output of the amplifier AMP, etc. On the other hand, for example, when the chop signal is logic high, the input voltage IN may be applied to the (+) input terminal of the amplifier AMP, and a second offset ($+\Delta V$) may occur at the output of the amplifier AMP, etc.

By changing the chop signal from logic high to logic low over time, an effect of offsetting a first output voltage VO1 of the amplifier AMP according to a first input voltage may occur, and an effect of offsetting a second output voltage VO2 of the amplifier AMP according to a second input voltage may occur.

Figure 14:
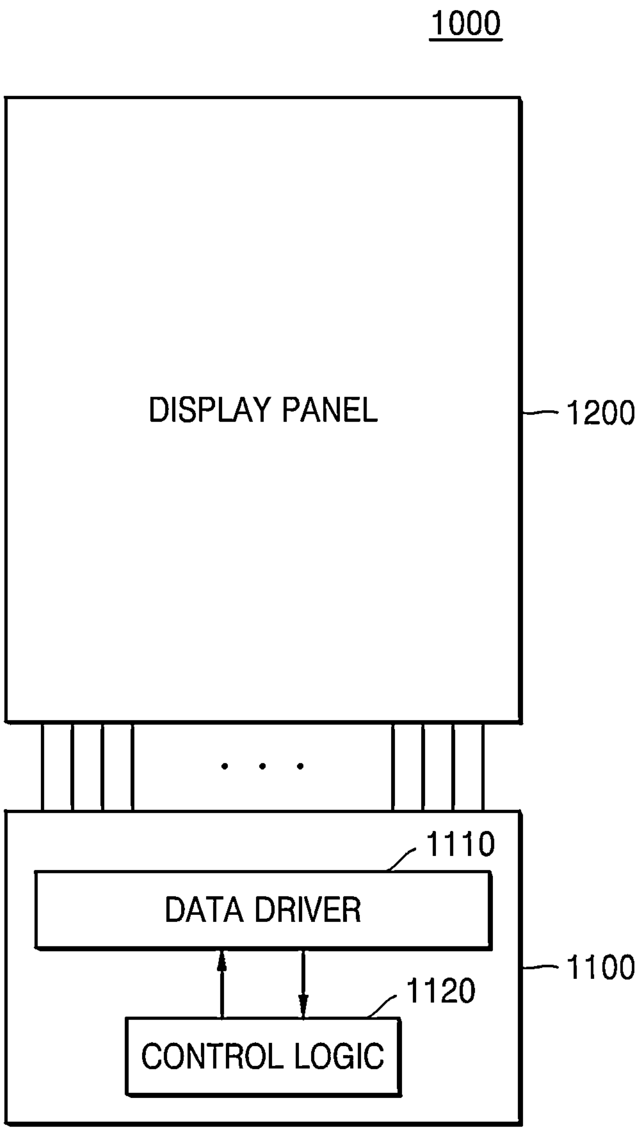
FIG. 14 illustrates an implementation of a display device according to at least one example embodiment of the inventive concepts.

FIG. 14 illustrates an implementation of a display device 1000 according to at least one example embodiment of the inventive concepts. The display device 1000 of FIG. 14 is a device including a small display panel, for example, a display panel 1200, and may be applied to, for example, a mobile device such as a smartphone and/or a tablet, but the example embodiments are not limited thereto.

Referring to FIG. 14, the display device 1000 may include a display driving circuit 1100 and the display panel 1200, etc., but the example embodiments are not limited thereto. The display driving circuit 1100 may include one or more integrated circuits (ICs), but is not limited thereto. The display driving circuit 1100 may be mounted on a circuit film such as a tape carrier package (TCP), a chip on film (COF), a flexible print circuit (FPC), etc., may be attached to the display panel 1200 by using a tape automatic bonding (TAB) method, and/or may be mounted on a non-display area (e.g., an area in which an image is not displayed) of the display panel 1200 by using a chip on glass (COG) method, etc., but the example embodiments are not limited thereto.

The display driving circuit 1100 may include a data driver 1110 and/or a control logic 1120 (e.g., processing circuitry, etc.), and may further include a gate driver (not shown), but the example embodiments are not limited thereto. In at least one example embodiment, the gate driver may be mounted on the display panel 1200. The pixel driving circuits 200 and 200*a* described with reference to FIGS. 1 to 13C may include a data driver 1110. As another example, one of the pixel circuits 100, 100*a*, 100*a*', and 100*b* described with reference to FIGS. 1 to 13C may be mounted on and/or otherwise connected to the display panel 1200, but the example embodiments are not limited thereto.

While various example embodiments of the inventive concepts have been particularly shown and described with reference to example embodiments thereof, it will be understood that various changes in form and details may be made therein without departing from the spirit and scope of the following claims.

What is claimed is:

1. An integrated circuit comprising:
a first pin configured to receive an image signal;
a second pin configured to receive a scan signal;
a driver transistor configured to generate an output current according to a voltage of a gate node based on the scan signal and the image signal; and
an overvoltage detection circuit configured to generate a detection signal in response to a voltage of an output pin exceeding a reference voltage, and
the overvoltage detection circuit including an off transistor configured to block the output current by discharging the gate node based on the detection signal.

2. The integrated circuit of claim 1, wherein the overvoltage detection circuit further includes:
a logic gate configured to control the off transistor by receiving an off control signal and the detection signal.

3. The integrated circuit of claim 1, wherein the integrated circuit further includes:
a first transistor connected between the first pin and a node, the first transistor including a gate terminal configured to receive the scan signal;
a second transistor connected between the node and a ground terminal, the second transistor including a gate terminal connected to the node; and
a third transistor connected between the node and the gate node.

4. The integrated circuit of claim 1, wherein the overvoltage detection circuit further includes:
a detection transistor including a gate terminal configured to receive the voltage of the output pin.

5. The integrated circuit of claim 4, wherein
the overvoltage detection circuit further includes an inverter connected to the detection transistor; and
the detection transistor is a P-type transistor.

6. The integrated circuit of claim 5 wherein the reference voltage is obtained by subtracting a threshold voltage of the detection transistor from an internal voltage received by the detection transistor.

7. The integrated circuit of claim 4, wherein the overvoltage detection circuit further includes:
a fourth transistor connected between the output pin and the driver transistor; and
a fifth transistor connected between the detection transistor and a ground terminal.

8. An integrated circuit comprising:
a first pin configured to receive an image signal;
a second pin configured to receive a scan signal;
a driver transistor configured to generate an output current based on the scan signal and the image signal; and
a de-ghost transistor configured to discharge a gate node of the driver transistor.

9. The integrated circuit of claim 8 wherein the de-ghost transistor is configured to control the gate node in response to a de-ghost signal and the scan signal.

10. The integrated circuit of claim 9 wherein the de-ghost signal is synchronized with the scan signal.

11. The integrated circuit of claim 9, wherein the integrated circuit further includes:

an AND gate configured to receive the de-ghost signal and the scan signal; and the de-ghost transistor is configured to switch on based on an output signal of the AND gate.

12. The integrated circuit of claim 9, wherein the integrated circuit further includes:

a third pin configured to receive the de-ghost signal.

13. The integrated circuit of claim 8, wherein the integrated circuit further includes:

a first transistor connected between the first pin a node, the first transistor including a gate terminal configured to receive the scan signal;

a second transistor connected between the node and a ground terminal, the second transistor including a gate terminal connected to the node; and a third transistor connected between the node and the gate node, the third transistor including a gate terminal configured to receive the scan signal.

14. The integrated circuit of claim 8, wherein the integrated circuit further includes:

a first transistor connected between the first pin and a node, the first transistor including a gate terminal configured to receive the scan signal;

a second transistor connected between the node and a ground terminal, the second transistor including a gate terminal connected to the gate node; and a third transistor connected between the node and the gate node, the third transistor including a gate terminal configured to receive the scan signal.

15. An integrated circuit comprising:

an amplifier configured to amplify an input voltage;

a transistor configured to generate an image signal based on an output signal of the amplifier;

a first pin configured to output a scan signal; and a boosting circuit configured to provide a boosting current through a second pin outputting the image signal in response to a boosting signal, wherein a period during which the boosting current is provided ends before an on-period of the scan signal ends.

16. The integrated circuit of claim 15, wherein the period is included in the on-period of the scan signal.

17. The integrated circuit of claim 15, wherein the boosting circuit comprises:

a variable current source; and a switching transistor connected to the variable current source.

18. The integrated circuit of claim 17, wherein the boosting circuit is further configured to control the switching transistor to adjust the period.

19. The integrated circuit of claim 17, wherein the boosting circuit is further configured to control the variable current source to adjust a magnitude of the boosting current.

* * * * *